(12) United States Patent
Wu et al.

(10) Patent No.: US 6,193,619 B1
(45) Date of Patent: Feb. 27, 2001

(54) GOLF BALLS HAVING INNER LAYERS FORMED WITH CATIONIC IONOMERS

(75) Inventors: Shenshen Wu, North Dartmouth; Murali Rajagopalan, South Dartmouth, both of MA (US)

(73) Assignee: Acushnet Company, Fairhaven, CT (US)

( * ) Notice: Subject to any disclaimer, the term of this patent is extended or adjusted under 35 U.S.C. 154(b) by 0 days.

(21) Appl. No.: 09/309,774

(22) Filed: May 11, 1999

Related U.S. Application Data

(63) Continuation-in-part of application No. 08/980,575, filed on Dec. 1, 1997, now abandoned, which is a continuation-in-part of application No. 08/482,519, filed on Jun. 7, 1995, now Pat. No. 5,692,974.

(51) Int. Cl.[7] ............................. A63B 37/06; A63B 37/08
(52) U.S. Cl. ......................... 473/374; 156/145; 156/146; 273/DIG. 22; 428/423.1; 428/423.3; 428/423.9; 473/358; 473/361; 473/362; 473/363; 473/372; 473/373; 473/375; 473/376; 473/377
(58) Field of Search .............................. 428/423.1, 423.3, 428/423.9; 473/358, 361, 362, 363, 372, 373, 374, 375, 376, 377; 273/DIG. 22; 156/145, 146

(56) References Cited

U.S. PATENT DOCUMENTS

| | | | |
|---|---|---|---|
| 4,431,193 | 2/1984 | Nesbitt | 273/235 |
| 4,625,964 | 12/1986 | Yamada | 273/62 |
| 4,650,193 | 3/1987 | Molitor et al. | 273/228 |
| 4,714,253 | 12/1987 | Nakahara et al. | 273/228 |
| 4,848,770 | 7/1989 | Shama | 273/228 |
| 4,863,167 | 9/1989 | Matsuki et al. | 273/62 |
| 4,919,434 | 4/1990 | Saito | 273/235 |
| 5,002,281 | 3/1991 | Nakahara et al. | 273/220 |
| 5,072,944 | 12/1991 | Nakahara et al. | 273/220 |
| 5,155,157 | 10/1992 | Statz et al. | 524/423 |
| 5,184,828 | 2/1993 | Kim et al. | 273/228 |
| 5,253,871 | 10/1993 | Viollaz | 273/228 |
| 5,314,187 | 5/1994 | Proudfit | 273/235 |
| 5,334,673 | 8/1994 | Wu | 273/235 |
| 5,439,227 | 8/1995 | Egashira et al. | 273/228 |
| 5,543,467 | 8/1996 | Hamada et al. | 525/207 |
| 5,556,098 | 9/1996 | Higuchi et al. | 473/373 |
| 5,565,524 | 10/1996 | Hamada et al. | 525/208 |
| 5,631,324 | 5/1997 | Rajagopalan et al. | 473/385 |
| 5,681,898 | 10/1997 | Pocklington | 525/193 |
| 5,733,428 | 3/1998 | Calabria et al. | 264/134 |
| 5,888,437 | 3/1999 | Calabria et al. | 264/135 |

*Primary Examiner*—D. S. Nakarani
(74) *Attorney, Agent, or Firm*—Pennie & Edmonds LLP

(57) ABSTRACT

This invention relates to methods of using cationic ionomers in the composition of inner layers of golf balls. Further, this invention relates to golf balls comprising one or more inner layers and which incorporate polyurethane or polyurea ionomers. The golf ball with inner layers comprising cationic ionomers has improved ball feel and initial velocity through the addition of an alkylating agent such as t-butyl chloride to introduce ionic interactions in the polyurethane or polyurea and thereby produce cationic type ionomers.

23 Claims, No Drawings

GOLF BALLS HAVING INNER LAYERS FORMED WITH CATIONIC IONOMERS

CROSS-REFERENCE TO RELATED APPLICATION

This application is a continuation-in-part of U.S. patent application Ser. No. 08/980,575 filed Dec. 01, 1997, now abandoned, which is a continuation of U.S. patent application Ser. No. 08/482,519 filed Jun. 7, 1995 which issued Dec. 2, 1997 as U.S. Pat. No. 5,692,974, the disclosures of which are hereby incorporated by reference in their entirety.

FIELD OF THE INVENTION

This invention relates to multi layer golf balls having one or more inner or intermediate layers formed with cationic ionomers and to methods of forming such golf balls. Further, this invention relates to a method of improving the resiliency in golf balls with inner layers comprising polyurethane, polyurea and copolymers thereof, through the use of quaternizing agents such as t-butyl chloride to introduce ionic interactions into the nitrogen containing polymers.

BACKGROUND OF THE INVENTION

Conventional golf balls can be divided into two general types or groups: solid balls or wound balls. The difference in play characteristics resulting from these different types of constructions can be quite significant.

Balls having a solid construction are generally most popular with the average recreational golfer because they provide a very durable ball while also providing maximum distance. Solid balls are made with a solid core, usually formed of a crosslinked rubber, which is encased by a cover material. Typically the solid core is formed of polybutadiene which is chemically crosslinked with zinc diacrylate and/or similar crosslinking agents and is covered by a tough, cut-proof blended cover. The cover is generally formed of a material such as SURLYN, which is a trademark for an ionomer resin produced by DuPont of Wilmington, Del. The combination of the core and cover materials provide a ball that is virtually indestructible by golfers. Further, such a combination imparts a high initial velocity to the ball which results in improved distance. Because the materials of which the ball is formed are very rigid, solid balls generally have a hard "feel" when struck with a club. Likewise, due to their hardness, these balls have a relatively low spin rate which provides greater distance.

At the present time, the wound ball remains the preferred ball of more advanced players due to its spin and feel characteristics. Wound balls typically have either a solid rubber or liquid center core around which many yards of a stretched elastic thread or yarn are wound. The wound core is then covered with a durable cover material such as a SURLYN or similar material or a softer cover such as balata or polyurethane. See Wu, U.S. Pat. No. 5,334,673. Wound balls are generally softer and provide more spin than non-wound balls, which enables a skilled golfer to have more control over the ball's flight and final position. Particularly, with approach shots into the green, the high spin rate of soft, wound balls enables the golfer to stop the ball very near its landing position.

A number of patents have been issued that are directed towards modifying the properties of a conventional solid ball by altering the typical single layer core and single cover layer construction to provide a multi-layer ball having such as a dual cover layer, dual core layer and/or a ball having a mantle layer disposed between the cover and the core. The inventions disclosed in the prior art patents are directed towards improving a variety of golf ball physical properties that help determine "in-play" characteristics.

Several patents are directed towards improving the carry distance of such balls. For example, U.S. Pat. No. 4,863,167 relates to a three piece solid golf ball having increased flight distance, wherein the ball has a center portion and an outer layer formed from a rubber composition, wherein the outer layer is harder than the center portion and further contains a gravity-adjusting filler so as to impart a higher specific gravity to the outer layer than that of the center portion. U.S. Pat. No. 5,184,828 relates to a solid three-piece golf ball having improved rebound characteristics and carry distance while maintaining an adequate spin rate, wherein these characteristics are allegedly obtained by controlling the size of the polybutadiene inner core and outer layer as well as their specific gravity and hardness. According to the '828 patent, the key to obtaining the desired rebound characteristics is that the maximum hardness (42–62 Shore D) must be located at the interface between the core and the mantle and the hardness must then decrease both inwardly and outwardly. U.S. Pat. No. 4,714,253 is also directed towards a three-piece golf ball having an improved rebound coefficient. This golf ball has a core with a Shore C hardness of 57–80 in its center, but not more than 83 at a distance between 5–10 mm from its center and an outer layer with a Shore C hardness of 70–83.

Additionally, there are a number of patents directed towards improving the spin and feel of solid balls while maintaining the distance provided by the solid construction. For example, U.S. Pat. No. 5,072,944 discloses a three-piece solid golf ball having a center layer and an outer layer that are prepared from a rubber composition, wherein it is desirable that the center core layer is softer than the outer layer, the layers having a hardness (Shore C) of 25–50 and 70–90, respectively.

U.S. Pat. No. 4,625,964 relates to a solid golf ball having a polybutadiene rubber core of a diameter not more than 32 mm, a polybutadiene rubber intermediate layer having a specific gravity of lower than that of the core material, and a cover. U.S. Pat. No. 4,650,193 is directed towards a solid golf ball having a core comprising a central portion and an integral outer layer, wherein the core is a curable elastomer such as polybutadiene which is treated with a cure altering agent to soften an outer layer of the core, to produce a central layer with a hardness (Shore C) of greater than 75 and an outer layer with a hardness (Shore A) of less than 80.

U.S. Pat. No. 4,848,770 discloses a solid three-piece golf ball which includes a core of a highly filled synthetic rubber or polymeric material, an intermediate mantle of an unfilled synthetic rubber and a cover. The core and intermediate mantle have a hardness of between 50–95 Shore D. U.S. Pat. No. 5,002,281 is directed towards a three-piece solid golf ball which has an inner core having a hardness of 25–70 (Shore C), an outer shell having a hardness of 80–95 (Shore C) and a cover. Further, the specific gravity of the inner core must be greater than 1.0, but less than or equal to that of the outer shell, which must be less than 1.3.

The prior art discloses a variety of materials other than polybutadiene for use as intermediate layers. For example, U.S. Pat. No. 5,253,871 concerns a golf ball having a three-piece structure comprising an elastomer core, an intermediate layer of a thermoplastic material containing at least 10% of ether block copolymer, preferably blended with an ionomer, and a thermoplastic cover. U.S. Pat. No. 5,681,898 is directed to a multilayer golf ball having a conventional polybutadiene core, an ionomer cover and an intermediate layer formed from a blend of an ethylene methacrylic acid copolymer and a vulcanizate formed from polybutadiene and a peroxide curing agent. U.S. Pat. Nos. 5,439,227 and 5,556,098 both disclose multilayer golf balls which have a conventional polybutadiene core, conventional covers and an intermediate layer formed from a polyetherester block copolymer blended with an ionomer.

Further, there are also several patents which are directed to golf balls having multiple cover layers. For example U.S. Pat. No. 4,431,193 relates to a golf ball having a multilayer cover wherein the inner layer is a hard, high flexural modulus ionomer resin and the outer layer is a soft, low flexural modulus ionomer resin, and wherein either or both layers may comprise a foamed ionomer resin. U.S. Pat. No. 5,314,187 also relates to golf balls having a multiple layer cover, wherein the outer layer is molded over the inner layer and comprises a blend of balata and an elastomer and the inner layer is an ionomer resin. U.S. Pat. No. 4,919,434 is directed towards a golf ball having a cover which comprises an inner layer and an outer layer, each of which comprise a thermoplastic resin. Preferably the layers are comprised of materials that are capable of bonding with each other, for example, by heat, or by other means which are readily known to one of ordinary skill in the art.

Additionally, U.S. Pat. No. 5,631,324 is directed to a golf ball wherein the terpolymer composition of the core, mantle layers, or cover comprises an epoxy (i.e., glycidyl moiety) and an ionomer material. U.S. Pat. No. 5,155,157 provides compositions useful in the manufacture of one-, two- and three-piece golf balls that comprises blends of block copolymers, an ionomer material, and an epoxy-containing compound. U.S. Pat. No. 5,565,524 provides a golf ball having a cover that comprises an ionomer material and a glycidyl-group-containing olefinic copolymer. U.S. Pat. No. 5,543,467 discloses a golf ball having a core and a cover in which the base material of the cover comprises a maleic anhydride-modified olefinic copolymer, an ionomer resin, and a glycidyl-group-containing olefinic copolymer.

However, none of the patents discussed above disclose the use of cationic ionomers to form intermediate layers as found in the golf balls of the current invention.

SUMMARY OF THE INVENTION

The present invention is directed to a cationic polymer golf ball forming composition for use in inner layers of golf balls that offers improved ball properties over prior art materials.

Further, the present invention is directed to a golf ball having a cover and one or more inner layers wherein one or more of the inner layers is formed from a material comprising at least one cationic polymer.

In addition, the present invention is directed to a golf ball having a cover and one or more inner layers wherein one or more of the inner layers comprises a cationic polymer comprising a quaternary ammonium ionomer.

Still further, the present invention is directed to a golf ball having a core, a cover and one or more inner layers wherein one or more of the inner layers comprises a cationic polymer in the form of a polyurethane ionomer or a polyurea ionomer and mixtures thereof.

The present invention is also directed to novel methods of forming golf balls having one or more inner layers comprising at least one cationic polymer.

DETAILED DESCRIPTION OF THE INVENTION

As used herein, an ionomer is an organic polymer having one or more sites that have a positive or negative charge.

Cationic ionomers according to the claimed invention are well known to the person of ordinary skill in the art. In particular, cationic ionomers have a structure according to formula I:

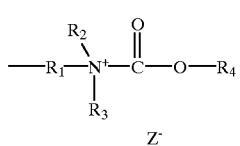

Formula I or formula II

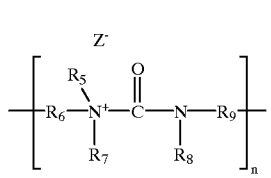

Formula II

Wherein $R_1$, $R_2$, $R_3$, $R_4$, $R_5$, $R_6$, $R_7$, $R_8$, and $R_9$ are organic moieties selected from the group consisting of linear or branched chain alkyl, carbocyclic or aryl; and Z is the negatively charged conjugate ion produced following alkylation and/or quaternization.

As used herein, the phrase linear chain or branched chain alkyl groups means any substituted or unsubstituted acyclic carbon-containing compound. Examples of alkyl groups include lower alkyl, for example, methyl, ethyl, n-propyl, iso-propyl, -butyl, iso-butyl or tert-butyl; upper alkyl, for example, octyl, nonyl, decyl. The ordinary skilled artisan is familiar with numerous linear and branched alkyl groups, which are within the scope of the present invention.

In addition, such alkyl group may also contain various substituents in which one or more hydrogen atoms has been replaced by a functional group. Functional groups include but are not limited to hydroxyl, amino, carboxyl, amide, ester, ether, sulfonic, siloxane, sulfonyl, and halide (fluoride, chloride, bromide and iodide), to mention but a few.

As used herein, substituted and unsubstituted carbocyclic groups means cyclic carbon-containing compounds, including but not limited to cyclopentyl, cyclohexyl, cycloheptyl, admantyl, and the like. Such cyclic groups may also contain various substituents in which one or more hydrogen atoms has been replaced by a functional group. Such functional groups include those described above, and lower alkyl groups as also described above. The cyclic groups of the invention may further comprise a heteroatom.

As used herein, the phrase substituted and unsubstituted aryl groups, means a hydrocarbon ring bearing a system of conjugated double bonds, usually comprising six or more even number of Π (pi) electrons. Examples of aryl groups include, but are not limited to, phenyl, naphthyl, anisyl, toluyl, and the like. These aryl groups may also be substituted with a variety of functional groups as are well known in the art.

Cationic polyurethane ionomers are most commonly produced by reacting a polyurethane with an alkylating agent. Polyurethanes can be produced according to any technique known to the chemist of ordinary skill in the art. These methods can include for example, co-reacting polyisocyanates with a polyol and curatives. Linear polyurethanes can be obtained from difunctional reactants while branched polyurethanes can be made from a combination of difunctional and higher functional reactants.

Polyurethane results from the reaction between a polyurethane prepolymer and a curing agent or agents. The polyurethane prepolymer is the product of a reaction between a polyol and a polyisocyanate. Curing agents such as functional polyamines, glycols and diols can be used to cure polyurethane. A catalyst can be employed to promote the reaction between the curing agent and the polyurethane prepolymer.

Conventionally, there are two categories of polyurethane on the market, i.e., thermoset and thermoplastic. Thermoplastic polyurethanes are formed from a polyisocyanate, such as 4,4'-diphenylmethane diisocyanate (MDI) or 3,3'-dimethyl-4,4'-biphenylene diisocyanate (TODI), reacted with a polyol cured with a diol, such as 1,4-butanediol. Thermoset polyurethanes are formed from a polyisocyanate, such as 2,4-toluene diisocyanate (TDI) or methylenebis-(4-cyclohexyl isocyanate) (HMDI), reacted with a polyol which is cured with a polyamine, such as methylenedianiline (MDA), or a trifunctional glycol, such as trimethylol propane, or tetrafunctional glycol, such as N,N,N',N'-tetrakis(2-hydroxypropyl)ethylenediamine.

Suitable polyether polyols include polytetramethylene ether glycol; poly(oxypropylene) glycol; and polybutadiene glycol. Suitable polyester polyols include polyethylene adipate glycol; polyethylene propylene adipate glycol; and polybutylene adipate glycol. Suitable polycaprolactone polyols include diethylene glycol initiated caprolactone; 1,4-butanediol initiated caprolactone; trimethylol propane initiated caprolactone; and neopentyl glycol initiated caprolactone. The preferred polyols are polytetramethylene ether glycol; polyethylene adipate glycol; polybutylene adipate glycol; and diethylene glycol initiated caprolactone.

Suitable polyamine curatives for use in the present invention are selected from the slow-reacting polyamine group consisting of 3,5-dimethylthio-2,4-toluenediamine; 3,5-dimethylthio-2,6-toluenediamine; N,N'-dialkyldiamino diphenyl methane; trimethylene-glycol-di-p-aminobenzoate; polytetramethyleneoxide-di-p-aminobenzoate; or a difunctional glycol; and mixtures thereof. 3,5-dimethylthio-2,4-toluenediamine and 3,5-dimethylthio-2,6-toluenediamine are isomers and are sold under the trade name ETHACURE® 300 by Albemarle Corporation. Trimethylene glycol-di-p-aminobenzoate is sold under the trade name VERSALINK 740M and polytetramethyleneoxide-di-p-aminobenzoates are sold under the trade name VERSALINK P- Series by Air Products and Chemicals, Inc. N,N'-dialkyldiamino diphenyl methane is sold under the trade name UNILINK® by UOP.

Suitable bifunctional glycols are 1,4-butanediol; 1,3-butanediol; 2,3-butanediol; 2,3-dimethyl-2,3-butanediol; low molecular weight poly tetramethylene glycol (PTMEG); propylene glycol; dipropylene glycol; ethylene glycol and diethylene glycol.

Accordingly, polyurethanes can be made from any of numerous commercially available aromatic, aliphatic and cycloaliphatic diisocyanates and polyisocyanates.

Cationic polyurethane ionomers are commonly produced by reacting a polyurethane with an alkylating and/or a quaternizing agent according to processes known to the person of ordinary skill in the art. Alkylating and/or quarternizing agents suitable for use in the present invention include alkyl and/or aromatic halides, such as 1-iodohexane, and preferably alkyl chlorides such as t-butyl chloride, dialkyl sulfates such as dimethyl sulfate and diethyl sulfate. Some strong acids are also suitable as alkylating and/or quarternizing agents. These acids include glacial acetic acid.

The positively charged alkylated and/or quaternized polyurethane ionomers formed by the reaction of a urethane with an alkylating and/or a quaternizing agent include, but are not limited to, thermoplastic and thermoset cationic polyurethane ionomers and cationic polyurea ionomers.

The cationic polyurethane ionomers may be produced by reacting a polyurethane with different amounts of an alkylating and/or quaternizing agent in a manner known to one of ordinary skill in the art so that the degree of quaternization of the ionomer can be varied. The golf balls of the invention typically contain inner layers which comprise tensioned elastomeric materials such as a polyurethane ionomer wherein the degree of quaternization is from about 1% to about 100%. More preferably, the inner layers comprise an urethane ionomer wherein the degree of quaternization is from about 10% to about 90%. As used herein, an inner layer refers to an inner cover, intermediate layer or mantle layer.

Preferably, a golf ball is made in accordance with the present invention by molding a cover about a core wherein the core comprises one or more layers, and wherein one or more of these layers is formed from a polyurethane composition comprising a polyurethane prepolymer and a polyamine curing agent.

The positively charged ionomers used in forming inner layers of the golf balls of the invention have in the past been utilized in the preparation of golf ball covers. The present invention encompasses the improvement whereby such positively charged ionomer materials are incorporated into the inner layers of golf balls, resulting in improved results in the performance of the golf ball as shown in the accompanying examples. That is, golf balls produced in accordance with the invention demonstrate good ball feel, and deliver increased initial velocity at lower ball compression while maintaining distance.

The golf balls of the invention can be prepared with or without the addition of a compatibilizer and with varying molecular architecture of blend components, such as varying molecular weight, tacticity, degrees of blockiness, etc., as is well known to those knowledgeable in the art of blending polymers. The cationic polymer materials may, if desired, be foamed.

Other conventional ingredients, e.g., density-controlling fillers, ceramics and glass spheres are well known to the person of ordinary skill in the art and may be included in both the cover and intermediate layer blends of the present invention in amounts effective to achieve their known purpose.

The selection of such filler(s) is dependent upon the type of golf ball desired (i.e., one-piece, two-piece multi-component or wound). Examples of useful fillers include zinc oxide, barium sulfate, calcium oxide, calcium carbonate and silica, as well as the other well known metals, corresponding salts and oxides thereof.

The golf balls of the invention further comprise a core. Such core may be hollow, solid or fluid filled.

The cover of the golf balls of the invention may also comprise a cationic polymer. Alternatively, or in addition thereto, the cover material may comprise any of the thermoplastic or thermoset polymer materials described herein.

With ionomers made in accordance with the present invention, the degree of cure which has taken place is dependent upon, inter alia, time, temperature, type of curative, and amount of catalyst used. The variation of these parameters to achieve a desired cure is well within the skill of one of ordinary skill in this art.

The dimpled golf ball product from the final molding step can be subjected to standard golf ball finishing operations such as buffing, painting, stamping and packaging according to techniques and practices well known in the art.

Materials according to the present invention may be used in any type of golf ball, i.e., having any type of construction, including, but not limited to, those mentioned below in the examples.

EXAMPLES

In order to exemplify the results achieved using the golf balls of the present invention with inner layers comprising cationic polyurethane ionomers, the following examples are provided without any intent to limit the scope of the instant invention to the compositions disclosed therein. All parts and percentages are by weight unless otherwise indicated.

Example 1

1 equivalent of VIBRATHANE B-979, a urethane prepolymer and 1 equivalent of VERSALINK P-650 were vacuum degassed in a vacuum oven maintained at 140° for one half hour. The components were mixed for 1 minute. In the control formulation no t-butyl chloride, an alkylating agent, was added. 0.3 equivalents of t-butyl chloride was used in formulation 1, and the contents of the beaker were further mixed for 1 minute. A summary of the ingredients of the various formulations according to this example appears in table I.

TABLE I

| Material | Control Formulation | Formulation 1 |
| --- | --- | --- |
| Vibrathane B-979* | 1 Eq | 1 Eq |
| Versalink P-650** | 1 Eq | 1 Eq |
| t-Butyl Chloride | — | .3 Eq |

*VIBRATHANE B-979: Reaction product of an excess 4,4'-diphenylmethane diisocyanate and polytetramethylene ether glycol. Manufactured by Uniroyal Chemical Co., Inc.
**VERSALINK P-650: An oligomeric diamine. Manufactured by Air Products and Chemicals, Inc.

The formulations were poured, centered and clamped according to the methods described in U.S. Pat. Nos. 5,733,428 and 5,888,437. When the materials reached the gel stage, a 1.430 inch solid center was placed into a female half smooth cavity mold maintained at approximately 165° F. which was then immediately mated with the male smooth cavity mold half which is maintained at about 165° F. The assembled mold was clamped and allowed to cure at ambient conditions for 30 minutes. The molded mantles were then removed from the mold and their physical properties tested.

A summary of some of the physical properties of the mantles are summarized below in table 2.

TABLE II

PHYSICAL PROPERTIES OF THE MANTLES

| Physical Property | Control Formulation | Formulation 1 |
| --- | --- | --- |
| Nameplate (inch) | 1.592 | 1.592 |
| Equator (inch) | 1.583 | 1.583 |
| Weight (g) | 40.67 | 40.51 |
| Corrected Compression | 72 | 66 |
| Coefficient of Restitution (at 125 ft/sec.) | 0.767 | 0.765 |

Core Properties:
Size: 1.430 inch
Weight: 30.59 g
Core Compression: 88
COR (at 125 ft/sec): 0.797

Example 2

1 equivalent of VIBRATHANE B-979, a urethane prepolymer, 0.7 equivalent of 1,4-butanediol, 0.3 equivalent of VERSALINK P-650, an oligomeric diamine, were vacuum degassed in a vacuum oven maintained at 1400 for one half hour. The prepolymer and 0.7 equivalent of 1,4-butanediol were mixed in the same beaker for 1 minute. 0.3 equivalent of VERSALINK P-650 was added and the entire composition was mixed an additional 1 minute. In the control formulation no t-butyl chloride, an alkylating agent, was added. 0.3 equivalents of t-butyl chloride was used in formulation 2, and the contents of the beaker were further mixed for 20 seconds. A summary of the ingredients of the various formulations according to this example appears in table III.

TABLE III

| Material | Control Formulation | Formulation 2 |
| --- | --- | --- |
| Vibrathane B-979* | 1 Eq | 1 Eq |
| 1,4-BDO | 0.7 Eq | 0.7 Eq |
| Versalink P650** | 0.3 Eq | 0.3 Eq |
| t-Butyl chloride | — | 0.3 Eq |

*VIBRATHANE B-979: Reaction product of an excess 4,4'-diphenylmethane diisocyanate and polytetramethylene ether glycol. Manufactured by Uniroyal Chemical Co., Inc.
**VERSALINK P-650: An oligomeric diamine. Manufactured by Air Products and Chemicals, Inc.

The formulations were poured, centered and clamped according to the methods described in U.S. Pat. Nos. 5,733,428 and 5,888,437. When the materials reached the gel stage, a 1.430 inch solid center was placed into a female half smooth cavity mold maintained at approximately 165° F. which was then immediately mated with the male smooth cavity mold half which is maintained at about 165° F. The assembled mold was clamped and allowed to cure at ambient conditions for 30 minutes. The molded mantles were then removed from the mold and their physical properties tested.

A summary of some of the physical properties of the mantles are summarized below in Table IV.

TABLE IV

PHYSICAL PROPERTIES OF THE MANTLES

| Physical Property | Control Formulation | Formulation 2 |
| --- | --- | --- |
| Nameplate (inch) | 1.592 | 1.590 |
| Equator (inch) | 1.581 | 1.579 |
| Weight (g) | 40.70 | 40.57 |

TABLE IV-continued

PHYSICAL PROPERTIES OF THE MANTLES

| Physical Property | Control Formulation | Formulation 2 |
|---|---|---|
| Corrected Compression | 74 | 73 |
| Coefficient of Restitution (at 125 ft/sec.) | 0.773 | 0.776 |

Core Properties
Size: 1.430"
Weight: 30.59 g
Core Compression: 88
COR (at 125 ft/sec): 0.797

The scope of the following claims is intended to encompass all obvious changes in the details, materials, and arrangement of parts that will occur to one of ordinary skill in the art.

What is claimed is:

1. A golf ball comprising a cover, a core and one or more inner layers wherein one or more of said inner layers is formed of a composition comprising a cationic polymer.

2. The golf ball according to claim 1 wherein the cationic polymer comprises a cationic quaternary ammonium ionomer.

3. The golf ball according to claim 2 wherein the quaternary ammonium ionomer is a cationic polyurethane ionomer or a cationic polyurea ionomer.

4. The golf ball according to claim 3 wherein at least one inner layer comprises a cationic polyurethane ionomer or a cationic polyurea ionomer with a degree of quaternization of from about 1% to about 100%.

5. The golf ball according to claim 4 wherein said at least one inner layer comprises a cationic polyurethane ionomer or a cationic polyurea ionomer with a degree of quaternization is from about 30% to about 70%.

6. The golf ball according to claim 5 wherein the cationic polyurethane ionomer is the reaction product of a quaternizing agent and a polyurethane.

7. The golf ball according to claim 6 wherein the quaternizing agent is t-butyl chloride.

8. The golf ball according to claim 1 wherein the inner layer is foamed.

9. The golf ball according to claim 1 wherein said core is hollow, solid or fluid filled.

10. The golf ball according to claim 1 wherein said composition further comprises density adjusting fillers.

11. The golf ball of claim 10 wherein the density adjusting fillers are metals.

12. The golf ball according to claim 1 wherein the cover and at least one inner layer is formed of the composition comprising a cationic polymer.

13. The golf ball according to claim 1 wherein the cover comprises a thermoplastic or thermoset material and the inner layer comprises a cationic polyurethane ionomer.

14. The golf ball according to claim 1 wherein the inner layer comprises a plurality of windings of a tensioned elastomeric material.

15. A method of making a golf ball comprising a cover and a core, said core comprising at least one layer, said method comprising the steps of:

(a) forming a core comprising at least one layer wherein at least one said inner layer is formed of a composition comprising a cationic polymer; and (b) forming a cover around said core.

16. A method according to claim 15 which comprises selecting a quaternary ammonium ionomer as said cationic polymer.

17. A method according to claim 16 which comprises selecting a cationic polyurethane ionomer as said quaternary ammonium ionomer.

18. A method according to claim 17 wherein the cationic polyurethane ionomer is formed by reacting 4,4-diphenylmethane diisocyanate, poly(tetra-methylene ether) glycol, at least one curing agent and at least one quaternizing agent.

19. The method of claim 18, which comprises selecting a diol or a diamine as the curing agent.

20. The method of claim 18, which comprises selecting 1,4 butanediol as the curing agent.

21. The method of claim 15, which comprises selecting a cationic polyurea ionomer as the cationic polymer.

22. The method of claim 15, which comprises selecting a thermoplastic cationic polyurethane or polyurea ionomer as the cationic polymer.

23. The method of claim 15, which comprises selecting a thermoset cationic polyurea ionomer as the cationic polymer.

* * * * *